US010677567B2

(12) United States Patent
Villalobos et al.

(10) Patent No.: US 10,677,567 B2
(45) Date of Patent: Jun. 9, 2020

(54) SHOCKWAVE CONTROLLED BALLISTIC PROTECTION

(71) Applicant: The Government of the United States of America, as represented by the Secretary of the Navy, Arlington, VA (US)

(72) Inventors: Guillermo R. Villalobos, Springfield, VA (US); Shyam S. Bayya, Ashburn, VA (US); Woohong Kim, Washington, DC (US); Bryan Sadowski, Falls Church, VA (US); Michael Hunt, Alexandria, VA (US); Robert E. Miklos, La Plata, MD (US); Colin C. Baker, Alexandria, VA (US); Jasbinder S. Sanghera, Ashburn, VA (US); Alex E. Moser, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 309 days.

(21) Appl. No.: 15/497,948

(22) Filed: Apr. 26, 2017

(65) Prior Publication Data
US 2017/0227333 A1 Aug. 10, 2017

Related U.S. Application Data

(63) Continuation-in-part of application No. 14/294,206, filed on Jun. 3, 2014, now abandoned.
(Continued)

(51) Int. Cl.
B32B 7/02 (2019.01)
F41H 5/04 (2006.01)
(Continued)

(52) U.S. Cl.
CPC ............ *F41H 5/0407* (2013.01); *B32B 7/02* (2013.01); *B32B 7/04* (2013.01); *B32B 15/04* (2013.01);
(Continued)

(58) Field of Classification Search
CPC ....... B32B 27/08; B32B 27/38; B32B 27/286; B32B 27/308; B32B 27/285; B32B 27/32;
(Continued)

(56) References Cited

U.S. PATENT DOCUMENTS 7,793,580 B2 9/2010 Jones et al.
8,746,122 B1 6/2014 Roland et al.
(Continued)

FOREIGN PATENT DOCUMENTS

EP 2109535 B1 * 4/2013 ........... B29C 43/003

OTHER PUBLICATIONS

M. Sodha and V. Jain, "On physics of armor penetration," Journal of Applied Physics, vol. 29, pp. 1769-1770, 1958.
(Continued)

*Primary Examiner* — Latosha Hines
(74) *Attorney, Agent, or Firm* — U.S. Naval Research Laboratory; Roy Roberts

(57) ABSTRACT

A transparent composite armor is made of tens to hundreds or even thousands of thin layers of material each with a thickness of 10-500 μm. An appropriate amount of impedance mismatch between the layers causes some reflection at each interface but limit the amplitude of the resulting tensile wave below the tensile strength of the constituent materials. The result is an improvement in ballistic performance and that will result is a significant impact in reducing size, weight, and volume of the armor.

11 Claims, 3 Drawing Sheets

Related U.S. Application Data

(60) Provisional application No. 61/830,401, filed on Jun. 3, 2013.

(51) Int. Cl.

| | | |
|---|---|---|
| *B32B 27/08* | (2006.01) | |
| *B32B 7/04* | (2019.01) | |
| *B32B 15/04* | (2006.01) | |
| *B32B 37/14* | (2006.01) | |
| *B32B 27/38* | (2006.01) | |
| *B32B 27/28* | (2006.01) | |
| *B32B 27/30* | (2006.01) | |
| *B32B 27/32* | (2006.01) | |
| *B32B 27/40* | (2006.01) | |
| *B32B 27/34* | (2006.01) | |
| *B32B 27/36* | (2006.01) | |
| *B32B 15/20* | (2006.01) | |

(52) U.S. Cl.
CPC .............. *B32B 15/20* (2013.01); *B32B 27/08* (2013.01); *B32B 27/281* (2013.01); *B32B 27/285* (2013.01); *B32B 27/286* (2013.01); *B32B 27/288* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B32B 37/14* (2013.01); *B32B 2250/03* (2013.01); *B32B 2250/24* (2013.01); *B32B 2250/42* (2013.01); *B32B 2307/412* (2013.01); *B32B 2307/54* (2013.01); *B32B 2307/558* (2013.01); *B32B 2307/732* (2013.01); *B32B 2309/105* (2013.01); *B32B 2311/18* (2013.01); *B32B 2311/24* (2013.01); *B32B 2333/12* (2013.01); *B32B 2375/00* (2013.01); *B32B 2457/00* (2013.01); *B32B 2571/02* (2013.01); *B32B 2605/006* (2013.01); *Y10T 428/24331* (2015.01); *Y10T 428/24545* (2015.01); *Y10T 428/24802* (2015.01); *Y10T 428/24917* (2015.01); *Y10T 428/24967* (2015.01)

(58) Field of Classification Search
CPC ....... B32B 27/40; B32B 27/34; B32B 27/288; B32B 27/36; B32B 27/304; B32B 27/281; B32B 27/302; B32B 27/365; B32B 37/14; B32B 7/04; B32B 7/02; B32B 15/04; B32B 15/20; B32B 2571/02; B32B 2309/105; B32B 2250/42; B32B 2457/00; B32B 2307/558; B32B 2307/54; B32B 2307/412; B32B 2307/732; B32B 2311/18; B32B 2311/24; B32B 2375/00; B32B 2605/006; B32B 2250/03; B32B 2250/24; B32B 2333/12; F41H 5/0407; Y10T 428/24802; Y10T 428/24917; Y10T 428/24967; Y10T 428/24331; Y10T 428/24545

See application file for complete search history.

(56) References Cited

U.S. PATENT DOCUMENTS

| | | |
|---|---|---|
| 8,789,454 B1 | 7/2014 | Roland et al. |
| 2008/0254281 A1* | 10/2008 | Chen ................. B32B 27/32 428/335 |
| 2011/0203452 A1 | 8/2011 | Kucherov et al. |
| 2012/0219749 A1* | 8/2012 | Leighton ............. B32B 18/00 428/76 |
| 2015/0147545 A1 | 5/2015 | Roland et al. |

OTHER PUBLICATIONS

S. Bless and N. Brar, "Failure Waves and Their Effects on Penetration Mechanics in Glass and Ceramics," in Shock Wave Science and Technology Reference Library, Berlin, Springer Berlin Heidelberg, 2007, pp. 105-141.

G. Kanel, A. Bogatch, S. Razorenov and A. Saviykh, "A systematic study of the failure wave phenomenon in brittle materials," European Research Office of the U.S. Army, London, 2003.

C. Roland, D. Fragiadakis and R. Gamache, "Elastomer-steel laminate armor," Composite Structures, vol. 92, pp. 1059-1064, 2009.

A. Tasdemirci and I. Hall, "Development of novel multilayer materials for impact applications: a combined numberical and experimental approach," Mater Des, vol. 30, pp. 1533-1541, 2009.

X. Teng, T. Wierzbicki and M. Huang, "Ballistic reistance of double-layered armor plates," International Journal of Impact Engineering, vol. 64, pp. 35-54, 2008.

G. Corbett, S. Reid and W. Johnson, "Impact loading of plates and shells by free-flying projectiles: a review," Int J Impact Eng, vol. 18, pp. 141-230, 1996.

G. Ben-Dor, A. Dubinsky and T. Elperin, "Improved Florence model and optimization of two-component armor against single impact or two impacts," Compos Struct, vol. 88, pp. 158-165, 2008.

H. Espinosa, N. Brar, G. Yuan, Y. Xu and V. Arrieta, "Enhanced ballistic performance of confined multi-layer caramic targets against long rod penetrators through interface defeat," Int J Solids Stuct, vol. 37, pp. 4893-4913, 2000.

A. Tasdemirci, I. Hall and M. Guiden, "Stress wave propagation effects in two- and three-layered composite materials," Journal of Composite Materials, vol. 38, pp. 995-1009, 2004.

G. Reyes-Villanueva and W. Cantwell, "The high velocity impact response of composite and FML-reinforced sandwich structure," Composites Science and Technology, vol. 64, pp. 35-54, 2004.

J. Kerns, A. Hsieh, A. Hiltner and E. Baer, "Comparison of irreversible deformation and yielding in microlayers of polycarbonate with poly(methylmethacrylate) and poly(styrene-co-acrylonitrile)," J Appl Polym Sci, vol. 77, pp. 1545-1557, 2000.

* cited by examiner

¾" of NRL's Multilayer Armor (1,227 ft/s impact velocity)

¾" Commercially Available Armor (1,236 ft/s impact velocity)

SHOCKWAVE CONTROLLED BALLISTIC PROTECTION

CROSS-REFERENCE TO RELATED APPLICATIONS

This application claims the benefit of U.S. Provisional Application No. 61/830,401 filed on Jun. 3, 2013 and of U.S. application Ser. No. 14/294,206 filed on Jun. 3, 2014, each of which is incorporated herein by reference in its entirety.

BACKGROUND

Traditionally, brittle ballistic armor materials have two primary failure mechanisms: (1) a failure wave ahead of the projectile creates a path of comminuted material that provides little resistance to the projectile, resulting in penetration; and/or (2) spalling on the back of the armor removes significant material ahead of the projectile, allowing penetration. [1] Both of these failure mechanisms are directly associated with the shockwave created by a ballistic impact. In two dimensions, the shockwave in a material can be visualized by dropping a pebble into a pond; the rings of outward propagating waves are the shockwaves in the water. To carry the analogy further, hurricane-produced waves crashing into a sea wall are higher energy shockwaves. The shockwave travels many times faster than the projectile and as stated above, can be very destructive to a material.

In the case of the failure wave, shockwaves are induced within the material as a result of rapid compression of the material's atoms and/or ions (in the remainder of this paragraph, the collective "atoms" refers to both atoms and ions) from the ballistic impact. The shockwave is in fact compressed atoms that travel, as do the waves in the pond. Just behind the shockwave front the atoms are forced much closer together than in their equilibrium state and are then violently repelled by interatomic forces further from the shockwave front. If the repelled atoms overcome their mutually attractive forces, the material fractures from these tensile forces. If the repelled atoms do not overcome their mutually attractive forces, they are violently dragged back together, pass the equilibrium point and end up oscillating like a spring. These oscillations are arbitrarily quantized and are called phonons. There are two general types. Optical phonons have very high energy and vibrate at frequencies where the atoms cannot vibrate in a coherent form. As the vibrations dampen, the optical phonons loose energy i.e. vibration speed, and are termed acoustic phonons. Although acoustic phonons do not necessarily produce sound nor vibrate at acoustic frequencies audible to the human ear, they do propagate similarly to acoustic waves in air (hence the name), as alternating bands of compressed and uncompressed atoms. The propagating acoustic phonon waves are termed lattice waves. As the shockwave moves through the material, it loses energy by generating lattice waves. Technically, it is the higher energy lattice waves that cause material fracture, which is why the failure wave and resulting fracture forms behind the shockwave front. If the energy density of the shockwave is below a specific threshold, lower energy lattice waves do not cause fracture unless several low energy lattice waves combine through constructive interference. In summary, there is a fundamental energy associated with the excitation of each of the phonons created that is generated as a result of the increased atomic motion and energy. The higher the energy of the phonon, the shorter its lifetime before it decays into multiple lower energy phonons. As these high energy phonons decay, they increase the intensity of existing lower energy phonons and once their atomic vibrational amplitude exceeds the strength of the material, it begins to fracture, giving rise to the failure wave. [2] [3]

Spalling on the back of armor result from a large high to low impedance mismatch between the back of the armor and what is behind it; generally air which has very low impedance. The behavior of shockwaves within a medium is largely controlled by the acoustic impedance of that medium. The acoustic impedance of a material is the product of the materials density and speed of sound (the mass flux). When a shockwave encounters an interface formed by two materials having a large acoustic impedance mismatch a large portion of the shockwave is reflected back into the material in which the shockwave was initially traveling while the rest is transmitted into the second material. The reflected shockwave is compressive in the case of a low to high impedance interface and tensile in the case of a high to low impedance interface e.g. the back of the armor where is meets the air. The amount of reflection and transmission is directly related to the difference in the impedance between the two materials. [4] A larger difference in the impedance of the two materials results in a larger amount of shockwave reflection. As the shockwave reflects off the armor/air interface, it creates a tensile wave. If the intensity of reflected tensile wave is higher than the tensile strength of the material, failure occurs in the form of spalling. For imperfect interfaces, there is an additional shockwave response known as scattering which means that the reflected or transmitted shockwave is deviated from its straight trajectory. Scattering can be caused by lower impedance imperfections within a material or at an interface that has a non-planar geometry such as roughness. [5]

Traditional ballistic protection seeks to defeat projectiles using materials that possess high strength, hardness, and fracture toughness arranged with low impedance mismatch at material interfaces to allow the shockwave to travel unimpeded as far as possible. [1] [6] [7] [8] This allows the penetrator a longer residence time in unspalled material causing the material to fail under compression instead of tension. In the case of transparent armor, this typically involves three to six layers of materials having thicknesses in the range of millimeters to centimeters, bonded to one another using various epoxies and other adhesives. [6] [9] [10] Previous approaches to improved ballistic performance against a given projectile have been to either find a stronger, harder, tougher material; or to add more of an existing armor material in between the projectile and the target. [11] [12] [13] This often results in heavy and bulky armor systems or systems decreasing mobility of the personnel and the mobility of their vehicles (this term includes land, air, and sea vehicles) and which leads to lower survivability. Additionally, there are many platforms (this term includes vehicles and fixed installations such as buildings) that have no ballistic protection because of design constraints. The result is that most armor systems have to make a tradeoff between performance, weight, and size.

There are newer armor systems where some secondary thought is given to shockwave reflection, but it is limited to uncontrolled scattering of the shockwave and resulting random generation of lattice waves. [4] [14] [15] [16] [17] The problem with these uncontrolled approaches is that the randomly scattered waves recombine through constructive interference, are not guided away from the penetrator, and cause fracture to the material ahead of the penetrator.

A need exists for techniques to control shockwave behavior within armor materials in order to minimize or eliminate the above two main failure mechanisms in traditional armor while minimizing armor weight and bulk.

BRIEF SUMMARY

In one embodiment, a composite material includes alternating layers of two different materials A and B in an ABABAB . . . pattern comprising at least 50 total layers bonded together in intimate contact with sharp interfaces between each adjoining layer, in the form of a transparent armor structure; wherein each layer has a thickness of from about 5 µm to about 500 µm; and wherein each of material A and B is selected from the group consisting of poly(methyl methacrylate) (PMMA), polycarbonate (PC), low density polyethylene (LDPE), high density polyethylene (HDPE), polypropylene (PP), polystyrene (PS), polymethylmethacrylate (PMMA), Nylon-6 (PA6), Nylon-6.6 (PA66), poly(ethylene terephthalate) (PET), poly(butylene terephthalate) (PBT), poly(acrylonitrile-butadiene-styrene) copolymer (ABS), polyetheretherketone (PEEK), polyphenylene sulfide (PPS), polysulfone (PSU), polyphenylsulfone (PPSU), polyvinyl chloride (PVC), polyvinylidene difluoride (PVDF), polytetrafluoroethylene (PTFE), poly(ethylene vinyl acetate) (EVA), polyimide, thermoplastic (PI), poly (dimethylsiloxane) (PDMS), epoxy resin, acrylates, and polyurethanes (PU). For example, the alternating layers can be poly(methyl methacrylate) (PMMA) and polycarbonate (PC).

In another embodiment, a composite material includes alternating layers of three different materials A, B, and C in an ABCABCABC . . . pattern comprising at least 50 total layers bonded together in intimate contact with sharp interfaces between each adjoining layer, forming a transparent armor structure; wherein each layer has a thickness of from about 5 µm to about 500 µm; and wherein each of material A, B, and C is selected from the group consisting of poly(methyl methacrylate) (PMMA), polycarbonate (PC), low density polyethylene (LDPE), high density polyethylene (HDPE), polypropylene (PP), polystyrene (PS), polymethylmethacrylate (PMMA), Nylon-6 (PA6), Nylon-6.6 (PA66), poly(ethylene terephthalate) (PET), poly(butylene terephthalate) (PBT), poly(acrylonitrile-butadiene-styrene) copolymer (ABS), polyetheretherketone (PEEK), polyphenylene sulfide (PPS), polysulfone (PSU), polyphenylsulfone (PPSU), polyvinyl chloride (PVC), polyvinylidene difluoride (PVDF), polytetrafluoroethylene (PTFE), poly(ethylene vinyl acetate) (EVA), polyimide, thermoplastic (PI), poly (dimethylsiloxane) (PDMS), epoxy resin, acrylates, and polyurethanes (PU).

In a further embodiment, a method of making a composite material includes stacking a total of at least 50 alternating layers of two different materials A and B in an ABABAB . . . pattern, wherein each layer has a thickness of from about 5 µm to about 500 µm; and bonding the alternating layers together in intimate contact with one another such that sharp interfaces exists between each adjoining layer, forming a transparent armor structure, wherein each of material A and B is selected from the group consisting of poly(methyl methacrylate) (PMMA), polycarbonate (PC), low density polyethylene (LDPE), high density polyethylene (HDPE), polypropylene (PP), polystyrene (PS), polymethylmethacrylate (PMMA), Nylon-6 (PA6), Nylon-6.6 (PA66), poly(ethylene terephthalate) (PET), poly(butylene terephthalate) (PBT), poly(acrylonitrile-butadiene-styrene) copolymer (ABS), polyetheretherketone (PEEK), polyphenylene sulfide (PPS), polysulfone (PSU), polyphenylsulfone (PPSU), polyvinyl chloride (PVC), polyvinylidene difluoride (PVDF), polytetrafluoroethylene (PTFE), poly(ethylene vinyl acetate) (EVA), polyimide, thermoplastic (PI), poly (dimethylsiloxane) (PDMS), epoxy resin, acrylates, and polyurethanes (PU).

BRIEF DESCRIPTION OF THE DRAWINGS

FIG. 3C shows results with a sample of non-layered PC armor.

DETAILED DESCRIPTION

Definitions

Figure 1B:
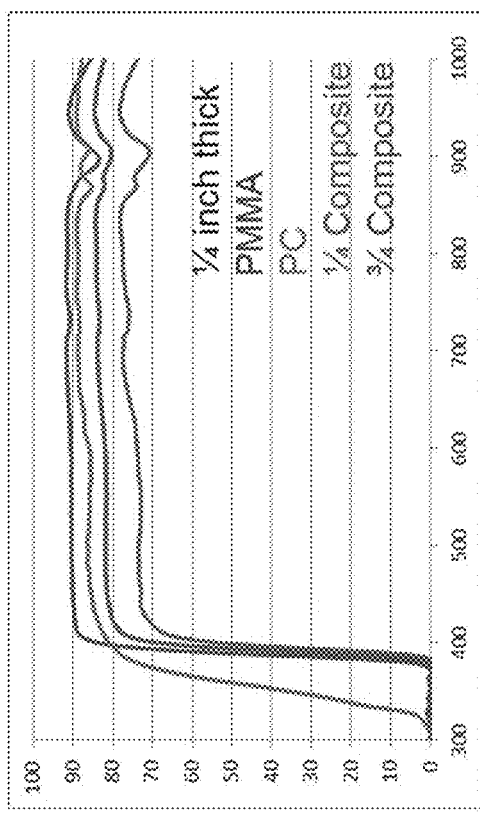
FIG. 1B shows transmission measurements for ¼" and ¾" composite samples compared to their constituent materials.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the terms "atom and or atoms" applies to atoms, ions and molecules bonded in any type of bond including but not limited to ionic, covalent, Van der Waals, or steric bonding Description The inventors have found that a laminate structure including many thin layers of different impedances can form effective ballistic armor utilizing less thickness and therefore less weight compared with conventional armor. Preferably, the laminate includes multiple layers configured so that each layer dissipates a fraction of the energy imparted by a ballistic strike that arrives with an energy level on the order of that of the design capacity of the entire laminate structure. The impedance variations from layer to layer act to dissipate the compressive wave produced by a ballistic impact.

The performance of armor can be improved by exploiting the shockwave reflections created by impedance mismatches in dissimilar materials as well as a large number of interfaces to attenuate and dissipate shockwaves and their associated energy. The basic concept is to use tens to hundreds or even thousands of thin layers (each with a thickness of 10-500 µm) with an appropriate amount of impedance mismatch to cause some reflection at each interface but limit the amplitude of the resulting tensile wave below the tensile strength of the constituent materials. A proof of concept armor made according to such a design exhibited a ~45% improvement in ballistic performance and that will result is a significant impact in reducing size, weight, and volume of the armor.

Much as a mirror must possess a smoothly polished reflecting surface to accurately reflect light waves, the interfaces of the layers should be properly shaped and bonded to controllably reflect the lattice waves. Additionally, the layers should not merely reflect the lattice waves and allow random travel of the waves through the material. Instead, the layers should be of specific thickness (depending on the materials impedance) to capture and guide the lattice waves laterally. The analogue here is the layers guide the lattice waves in a similar manner as fiber optics and planar wave guides guide light. Specific conditions should be manufactured into the material with forethought to achieve the desired results. Furthermore, the amount of reflection is critical. If the impedance mismatch is too great, the resulting reflected lattice wave will fracture the material. Only a small percentage of the shockwave can be allowed to reflect, depending on the shockwave energy and the material strength. For this reason, tens, hundreds, or even thousands of layers are required depending on the projectile's energy.

Since the tensile wave preferably never exceeds the tensile strength of the constituent materials, spalling is greatly reduced or eliminated. Additionally, the impedance mismatch at each interface is used to guide the shockwave laterally as a means of exciting phonons in a larger area of the material, thereby reducing the individual phonon energy over that area. As a result, if the atomic vibrational amplitude remains below the theoretical strength of each constituent material, the formation of a catastrophic failure wave within the armor can be prevented.

Much effort has been focused to obtain stronger bonding/adhesion between layers to achieve better ballistic performance of a composite. However, most of the traditional approaches were not successful and resulted in an inferior ballistic performance compared with monolithic ballistic armor. A typical method of forming analogous laminate structures often involve bonding at elevated temperatures, e.g., temperatures high enough to cause substantial softening/melting of at least one material layer. They often diffuse into each other to form a graded interface. A typical processing temperature is very high, i.e., >145° C. for PMMA/PC laminate. As a result, the laminate structure produced in this way lacks sharp interfaces and forms very strong adhesion/bonding between the layers. As shown in the reference, they typically resulted in poorer ballistic performances. [18]

Figure 3C:
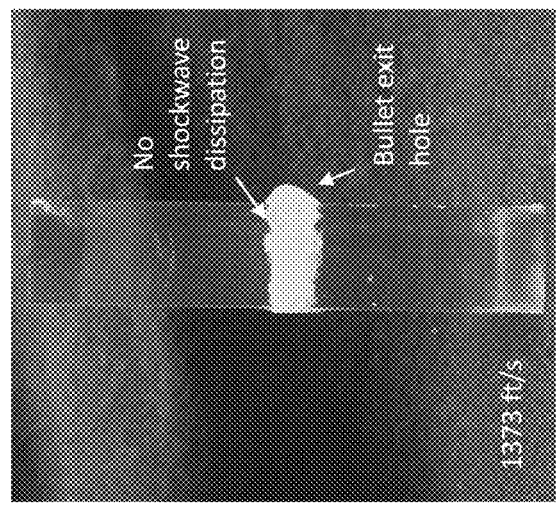
FIGS. 3A, 3B, and 3C show comparative results of ballistic testing of poly(methyl methacrylate) (PMMA)/polycarbonate (PC) layered armors (FIGS. 3A and 3B) and a non-alternating PC armor (FIG. 3C). The sample in FIG. 3A was bonded at 140° C. to produce sharp interfaces between layers, while the sample in FIG. 3B was bonded at 150° C. higher to produce a slightly more diffuse interface between layers.
Figure 3B:
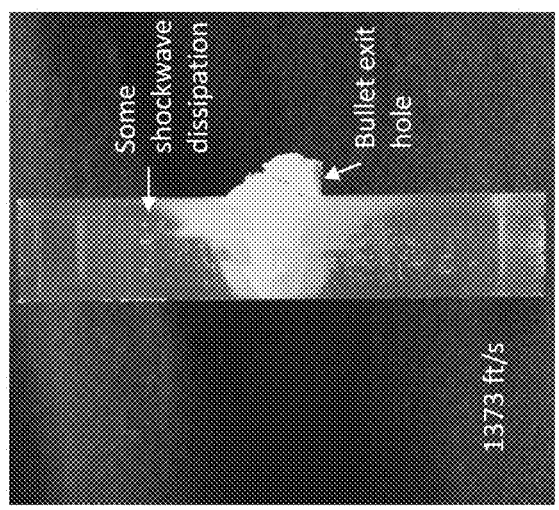
Figure 3A:
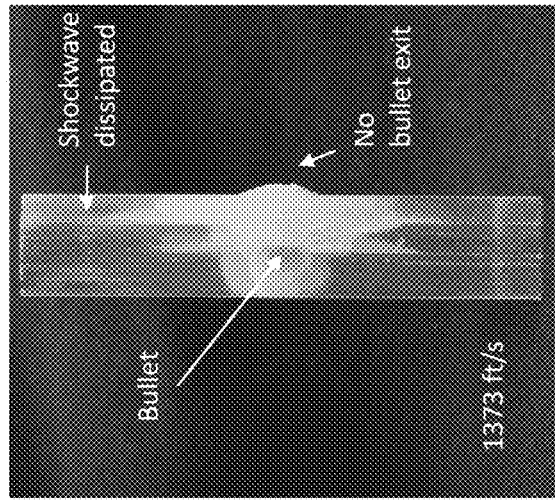

As seen in FIGS. 3A and 3B, it was surprisingly found that interfaces with a steep acoustic impedance gradient between layers actually improved performance against ballistic threats. Sharp interfaces between layers are generally indicative of weaker bonding between layers. The interfaces can be chemically or otherwise treated to create a sharp, but strong interface if such does not naturally form.

Other conventional bonding techniques, for example with adhesives between layers, can also be unsuitable. In certain embodiments, the interfaces between each layer of the structure are no greater than 10 nanometers in depth.

A suitable structure can be obtained by pressing layers of different materials together in a press, optionally with the addition of heat, for example polycarbonate and poly methyl methacrylate can be bonded at 140° C. in 20 minutes under a pressure of 2.5 MPa. Chemical treatment using an alcoholic base solution (KOH in isopropyl alcohol) or UV Ozone can further refine the bonding chemistry between layers. It can be desirable to tailor the strength of attachment between layers, for example by a combination of the above methods to ensure that certain layers are optimally bonded.

Examples

Commercially available sheets of polycarbonate (PC) and polymethyl methacrylate (PMMA) that were 115 µm and 175 µm thick, respectively, were stacked in alternating layers to achieve a stack of the desired thickness. The 136 layer stack was then bonded without adhesive at 140° C. for 20 minutes and 2.5 MPa using a hand operated press with heated platens and polished spacers to maintain a smooth outer surface on the resulting composite. Transmission of the shockwave attenuating micro-layered transparent polymer composite samples was characterized using a UV-Vis spectrophotometer. The composite samples were then cut to an appropriate size for ballistic testing and testing was conducted.

Figure 1A:
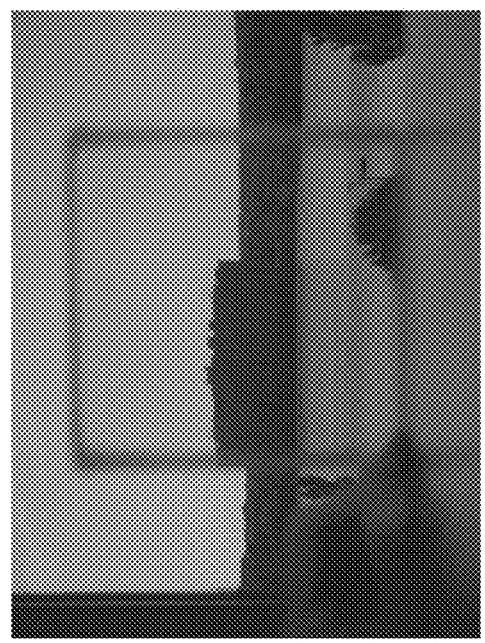
FIG. 1A shows a photo of a shockwave-attenuating micro-layered transparent polymer composite sample after bonding, illustrating a high degree of optical clarity.

FIG. 1A shows the front view of the shockwave attenuating polymer composite after removal from the hand press as well as the transmission of ¼" and ¾" thick composite samples compared with their constituent polymers. It is shown that the composite is visibly transparent with near theoretical transmission from 375 nm to beyond 1 µm. The building shown in the front view of FIG. 1 is approximately 1 mile away, demonstrating clear visibility even at long distances. FIG. 1B shows transmission measurements for ¼" and ¾" composite samples compared to their constituent materials.

Figure 2B:
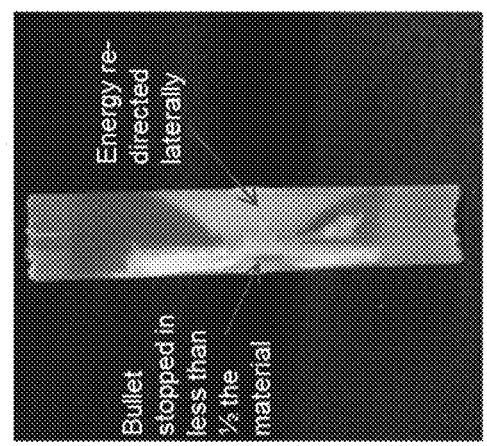
FIGS. 2A and 2B show comparative results of ballistic testing of commercially available armor and an attenuating micro-layered transparent polymer composite according to the invention, respectively.
Figure 2A:
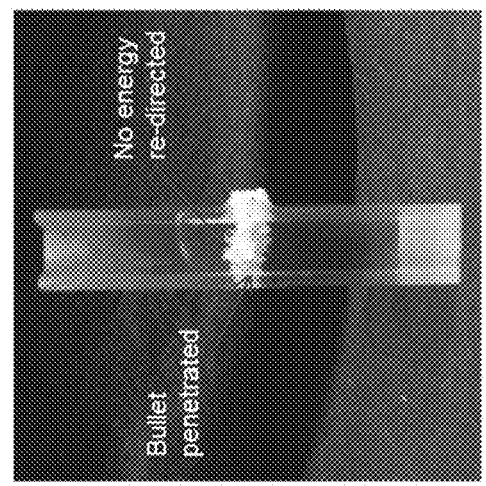

FIGS. 2A and 2B show the results of ballistic testing of commercially available transparent armor and a shockwave attenuating micro-layered transparent polymer, respectively, using a projectile with an impact velocity of about 1230 ft./s. An exit plume can clearly be seen in the commercially available armor, while in contrast the shockwave attenuating composite succeeds in stopping the projectile, leaving it embedded in the armor. The concept of shockwave spreading is also evident as the phonon energy in the commercially available armor was highly concentrated resulting in heating and potentially melting of the armor material eventually leading to complete penetration. On the other hand, the shockwave attenuating micro-layered transparent polymer shows a larger area of interaction as a result of the ballistic impact. The damage created is the result of phonons being excited over a much larger area as the shockwave interacted with the material. This simple and convenient method can be easily modified to create large scale and conformal shockwave attenuating micro-layered composites and we believe this technique is cost effective way to produce lightweight armor suitable for stopping a number of ballistic threats.

The importance of the nature of the interface between the layers (particularly the need for a sharp interface) can be seen in FIGS. 3A and 3B, which compare two PC/PMMA layered armors that began with the same composition (the number and sequence of materials layers and their thicknesses), but the sample in FIG. 3A was bonded at 140° C. to produce sharp interfaces between layers, while the sample in FIG. 3B was bonded at 150° C. which produced a slightly more diffuse the interface between the layers. The higher temperature sample with the diffuse interface failed to stop the bullet, whereas the sample bonded at a temperature of only 10° lower did stop the bullet. A diffuse or graded interface creates a smooth transition between the different impedance layers thereby preventing shockwave reflection in a similar manner as anti-reflective coatings on optics minimize reflection losses, or graded refractive index interfaces reduce optical reflection losses. The white coloration in FIG. 3A shows the effect of shockwave reflection, dissipation and guiding. The higher temperature laminate with the diffuse interfaces shows much less interaction. Since there is insufficient shockwave reflection, the material loses ballistic efficiency.

Further Embodiments

Applications of the laminate structure include transparent and non-transparent armor. Transparent armor applications can include windows, viewports and the like for vehicles or structures. Certain embodiments include a hard strike face on an exterior surface of the laminate, for example a glass strike face, or a ceramic strike face. Optionally, no additional armor is configured to operate in series with the laminate structure, other than perhaps an exterior hard strike face. For example, an inner face of the laminate structure can be directly exposed to the interior space of the vehicle or structure where human occupants are normally found.

In embodiments, the laminate structure has an overall structure of ABABABA . . . etc., where A and B each represent a layer of a specific material, with material A and material B having different impedances. The laminated structure can have more than 2 repeating layers such as ABCABCABC or even larger repeating units. Each individual layer may have a thickness of s. The external layers can be the same on each side of the structure, or different.

A wide variety of ceramics, metals, polymers, and composites may comprise the individual layers. Suitable materials for the laminate structure layers include without limitation: poly(methyl methacrylate) (PMMA), polycarbonate (PC), low density polyethylene (LDPE), high density polyethylene (HDPE), polypropylene (PP), polystyrene (PS), polymethylmethacrylate (PMMA), Nylon-6 (PA6), Nylon-6.6 (PA66), poly(ethylene terephthalate) (PET), poly(butylene terephthalate) (PBT), poly(acrylonitrile-butadiene-styrene) copolymer (ABS), polyetheretherketone (PEEK), polyphenylene sulfide (PPS), polysulfone (PSU), polyphenylsulfone (PPSU), polyvinyl chloride (PVC), polyvinylidene difluoride (PVDF), polytetrafluoroethylene (PTFE), poly(ethylene vinyl acetate) (EVA), polyimide, thermoplastic (PI), poly(dimethylsiloxane) (PDMS), epoxy resin, acrylates, and polyurethanes (PU). Also included in this listing are derivatives and copolymers of these materials.

Examples of bilayer system include PC/PMMA, PC/PS, PC/PE, PC/PU, PC/PDMS, PC/PP, PMMA/PP, PMMA/PS, PMMA/PE, PMMA/PDMS, and PMMA/PU. Trilayer systems can include PC/PMMA/PU, PC/PMMA/PDMS, PC/PMMA/PS, PC/PMMA/PE, and PC/PP/PE.

Layer thicknesses may vary over a wide range from stack to stack and layer thicknesses may vary within a single stack. The technique may be used in conjunction with standard armor strike plates. Furthermore, blast protection variants are possible.

Advantages

Described herein is a new technique for dealing with shockwaves generated as a result of ballistic impact that minimizes the effects of the shockwave that lead to armor failure. The technique for producing these structures is simple as well as being economically viable and scalable to large sizes. Furthermore, it can be applied to both transparent and opaque armor systems as well as devices that require shockwave or phonon guiding. An exemplary embodiment demonstrated ballistic protection against 9 mm projectile traveling at ~1,230 ft/sec. The ideas apply to 2D and 3D structures as well as conformal structures.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

[1] M. Sodha and V. Jain, "On physics of armor penetration," Journal of Applied Physics, vol. 29, pp. 1769-1770, 1958.

[2] S. Bless and N. Brar, "Failure Waves and Their Effects on Penetration Mechanics in Glass and Ceramics," in Shock Wave Science and Technology Reference Library, Berlin, Springer Berlin Heidelberg, 2007, pp. 105-141.

[3] G. Kanel, A. Bogatch, S. Razorenov and A. Saviykh, "A systematic study of the failure wave phenomenon in brittle materials," European Research Office of the U.S. Army, London, 2003.

[4] C. Roland, D. Fragiadakis and R. Gamache, "Elastomer-steel laminate armor," Composite Structures, vol. 92, pp. 1059-1064, 2009.

[5] A. Tasdemirci and I. Hall, "Development of novel multilayer materials for impact applications: a combined numerical and experimental approach," Mater Des, vol. 30, pp. 1533-1541, 2009.

[6] M. Backman and W. Goldsmith, "The mechanics of penetration of projectiles into targets," Int J Eng Sci, vol. 16, pp. 1-99, 1978.

[7] X. Teng, T. Wierzbicki and M. Huang, "Ballistic resistance of double-layered armor plates," International Journal of Impact Engineering, vol. 64, pp. 35-54, 2008.

[8] G. Corbett, S. Reid and W. Johnson, "Impact loading of plates and shells by free-flying projectiles: a review," Int J Impact Eng, vol. 18, pp. 141-230, 1996.

[9] Y. Kucherov, G. Hubler and R. Gamache, "ARMOR PLATE". United States of America Patent Application 20110203452, 25 Aug. 2011.

[10] C. Jones, J. Rioux, J. Locher, E. Carlson, K. Farrell, B. Furchner, V. Pluen and M. Mandelartz, "Transparent Ceramic Composite". U.S. Pat. No. 7,793,580, 14 Sep. 2010.

[11] G. Ben-Dor, A. Dubinsky and T. Elperin, "Improved Florence model and optimization of two-component armor against single impact or two impacts," Compos Struct, vol. 88, pp. 158-165, 2008.

[12] H. Espinosa, N. Brar, G. Yuan, Y. Xu and V. Arrieta, "Enhanced ballistic performance of confined multi-layer ceramic targets against long rod penetrators through interface defeat," Int J Solids Struct, vol. 37, pp. 48934913, 2000.

[13] C. Roland, A. Saad, R. Gamache and D. Fragiadakis, "ELASTOMERIC BILAYER ARMOR INCORPORAT- ING SURFACE-HARDENED SUBSTATES". United States of America Patent Application 20150147545, 28 May 2015.

[14] A. Tasdemirci, I. Hall and M. Guiden, "Stress wave propagation effects in two- and three-layered composite materials," Journal of Composite Materials, vol. 38, pp. 995-1009, 2004.

[15] C. Roland, D. Fragiadakis and R. Gamache, "Multi-ply heterogeneous armor with viscoelastic layers and a corrugated front surface". U.S. Pat. No. 8,746,122, 10 Jun. 2014.

[16] C. Roland, D. Fragiadakis and R. Gamache, "Multi-ply heterogeneous armor with viscoelastic layers and cylindrical armor elements". U.S. Pat. No. 8,789,454, 29 Jul. 2014.

[17] G. Reyes-Villanueva and W. Cantwell, "The high velocity impact response of composite and FML-reinforced sandwich structure," Composites Science and Technology, vol. 64, pp. 35-54, 2004.

[18] J. Kerns, A. Hsieh, A. Hiltner and E. Baer, "Comparison of irreversible deformation and yielding in microlayers of polycarbonate with poly(methylmethacrylate) and poly(styrene-co-acrylonitrile)," J Appl Polym Sci, vol. 77, pp. 1545-1557, 2000.

What is claimed is:

1. A composite structure comprising:
alternating layers of two different materials A and B in an ABABAB . . . pattern comprising at least 50 total layers bonded together in intimate contact with sharp interfaces between each adjoining layer, in the form of a transparent armor structure;
wherein each layer has a thickness of from about 5 μm to about 500 μm;
wherein each of material A and B is selected from the group consisting of poly(methyl methacrylate) (PMMA), polycarbonate (PC), low density polyethylene (LDPE), high density polyethylene (HDPE), polypropylene (PP), polystyrene (PS), polymethylmethacrylate (PMMA), Nylon-6 (PA6), Nylon-6.6 (PA66), poly(ethylene terephthalate) (PET), poly(butylene terephthalate) (PBT), poly(acrylonitrile-butadiene-styrene) copolymer (ABS), polyetheretherketone (PEEK), polyphenylene sulfide (PPS), polysulfone (PSU), polyphenylsulfone (PPSU), polyvinyl chloride (PVC), polyvinylidene difluoride (PVDF), polytetrafluoroethylene (PTFE), poly(ethylene vinyl acetate) (EVA), polyimide, thermoplastic (PI), poly(dimethylsiloxane) (PDMS), epoxy resin, acrylates, and polyurethanes (PU); and
wherein the sharp interfaces have depths of no greater than 10 nanometers.

2. The composite structure of claim 1, wherein
said materials A and B are selected from the following pairs of materials PC/PMMA, PC/PS, PC/PE, PC/PU, PC/PDMS, PC/PP, PMMA/PP, PMMA/PS, PMMA/PE, PMMA/PDMS, and PMMA/PU.

3. The composite structure of claim 1, wherein said structure is free of adhesive between said layers.

4. A composite structure comprising:
alternating layers of poly(methyl methacrylate) (PMMA) and polycarbonate (PC) bonded together in intimate contact with sharp interfaces between each adjoining layer, in the form of a transparent armor structure comprising at least 50 total layers;
wherein each layer has a thickness of from about 5 μm to about 500 μm);
wherein the sharp interfaces have depths of no greater than 10 nanometers.

5. The composite structure of claim 4, in a state of having been made by bonding said PMMA and PC layers at a temperature of no greater than 145° C.

6. The composite structure of claim 4, wherein said structure is free of adhesive between said layers.

7. A composite structure comprising:
providing alternating layers of three different materials A, B, and C in an ABCABCABC . . . pattern comprising at least 50 total layers;
bonding the layers together in intimate contact with one another with sharp interfaces between each adjoining layer, forming a transparent armor structure;
wherein each layer has a thickness of from about 5 μm to about 500 μm;
wherein each of material A, B, and C is selected from the group consisting of poly(methyl methacrylate) (PMMA), polycarbonate (PC), low density polyethylene (LDPE), high density polyethylene (HDPE), polypropylene (PP), polystyrene (PS), polymethylmethacrylate (PMMA), Nylon-6 (PA6), Nylon-6.6 (PA66), poly(ethylene terephthalate) (PET), poly(butylene terephthalate) (PBT), poly(acrylonitrile-butadiene-styrene) copolymer (ABS), polyetheretherketone (PEEK), polyphenylene sulfide (PPS), polysulfone (PSU), polyphenylsulfone (PPSU), polyvinyl chloride (PVC), polyvinylidene difluoride (PVDF), polytetrafluoroethylene (PTFE), poly(ethylene vinyl acetate) (EVA), polyimide, thermoplastic (PI), poly(dimethylsiloxane) (PDMS), epoxy resin, acrylates, and polyurethanes (PU)); and
wherein the sharp interfaces have depths of no greater than 10 nanometers.

8. The composite structure of claim 7, wherein said structure is free of adhesive between said layers.

9. A method of making a composite structure, the method comprising:
stacking a total of at least 50 alternating layers of two different materials A and B in an ABABAB . . . pattern, wherein each layer has a thickness of from about 5 μm to about 500 μm; and
bonding the alternating layers together in intimate contact with one another such that sharp interfaces exists between each adjoining layer, forming a transparent armor structure,
wherein each of material A and B is selected from the group consisting of poly(methyl methacrylate) (PMMA), polycarbonate (PC), low density polyethylene (LDPE), high density polyethylene (HDPE), polypropylene (PP), polystyrene (PS), polymethylmethacrylate (PMMA), Nylon-6 (PA6), Nylon-6.6 (PA66), poly(ethylene terephthalate) (PET), poly(butylene terephthalate) (PBT), poly(acrylonitrile-butadiene-styrene) copolymer (ABS), polyetheretherketone (PEEK), polyphenylene sulfide (PPS), polysulfone (PSU), polyphenylsulfone (PPSU), polyvinyl chloride (PVC), polyvinylidene difluoride (PVDF), polytetrafluoroethylene (PTFE), poly(ethylene vinyl acetate) (EVA), polyimide, thermoplastic (PI), poly(dimethylsiloxane) (PDMS), epoxy resin, acrylates, and polyurethanes (PU)); and
wherein the sharp interfaces have depths of no greater than 10 nanometers.

10. The composite structure of claim 9, wherein said structure is free of adhesive between said layers.

11. The composite structure of claim 9, wherein said materials A and B are poly(methyl methacrylate) (PMMA) and polycarbonate (PC).

* * * * *